US010772022B2

(12) United States Patent
Jheng et al.

(10) Patent No.: US 10,772,022 B2
(45) Date of Patent: Sep. 8, 2020

(54) METHOD AND APPARATUS FOR INTER-SYSTEM HANDOVER IN WIRELESS COMMUNICATION

(71) Applicant: MEDIATEK INC., Hsinchu (TW)

(72) Inventors: Yu-Syuan Jheng, Taipei (TW); Guillaume Sebire, Espoo (FI); Chien-Chun Huang-Fu, Hsinchu (TW); Pavan Santhana Krishna Nuggehalli, Mountain View, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/893,194

(22) Filed: Feb. 9, 2018

(65) Prior Publication Data

US 2018/0234903 A1 Aug. 16, 2018

Related U.S. Application Data

(60) Provisional application No. 62/457,198, filed on Feb. 10, 2017.

(51) Int. Cl.
*H04W 24/00* (2009.01)
*H04W 36/16* (2009.01)
*H04W 36/00* (2009.01)

(52) U.S. Cl.
CPC ..... *H04W 36/165* (2013.01); *H04W 36/0066* (2013.01)

(58) Field of Classification Search
CPC .............................. H04W 36/30; H04W 36/24
See application file for complete search history.

(56) References Cited

U.S. PATENT DOCUMENTS 8,437,265 B2 * 5/2013 Zhi ...................... H04W 72/12
370/252
RE46,870 E * 5/2018 Kim ...................... H04W 36/14
(Continued)

FOREIGN PATENT DOCUMENTS

| CN | 102948216 A | 2/2013 |
| WO | WO 2008/020788 A1 | 2/2008 |
| WO | WO 2008/040503 A2 | 4/2008 |

(Continued)

OTHER PUBLICATIONS

International Search Report and Written Opinion dated Apr. 28, 2018 in PCT/CN2018/076263, 10 pages.

(Continued)

*Primary Examiner* — Hassan A Phillips
*Assistant Examiner* — Prenell P Jones
(74) *Attorney, Agent, or Firm* — Oblon, McClelland, Maier & Neustadt, L.L.P.

(57) ABSTRACT

Aspects of the disclosure provide a processing circuit in an electronic apparatus and a method to switch the electronic apparatus during an inter-system handover (HO) process from a source network system to a target network system. The processing circuit can include an inter-system HO signal processing module and a mapping module. The inter-system HO signal processing module can be configured to obtain a mapping relationship between a set of source bearers associated with the source network system and a first set of target bearers associated with the target network system based on quality of service (QoS) characteristics associated with the set of source bearers and the first set of target bearers. The mapping module can be configured to obtain a second set of target bearers based on resources allocated to the first set of target bearers by the target network system and to obtain a third set of target bearers that is based on the first and second set of target bearers.

20 Claims, 4 Drawing Sheets

(56) References Cited

U.S. PATENT DOCUMENTS

| | | | | |
|---|---|---|---|---|
| 2009/0129342 | A1* | 5/2009 | Hwang | H04W 36/0022 |
| | | | | 370/331 |
| 2011/0310737 | A1 | 12/2011 | Klingenbrunn et al. | |
| 2011/0310850 | A1 | 12/2011 | Klingenbrunn et al. | |
| 2011/0310851 | A1 | 12/2011 | Klingenbrunn et al. | |
| 2012/0008525 | A1* | 1/2012 | Koskinen | H04W 28/22 |
| | | | | 370/253 |
| 2014/0206353 | A1* | 7/2014 | Kim | H04W 36/14 |
| | | | | 455/436 |
| 2014/0364121 | A1 | 12/2014 | Zhao et al. | |
| 2015/0003243 | A1 | 1/2015 | Klingenbrunn et al. | |
| 2015/0327163 | A1* | 11/2015 | Pack | H04W 64/003 |
| | | | | 370/328 |
| 2016/0119762 | A1* | 4/2016 | Zhu | H04W 76/27 |
| | | | | 370/312 |
| 2016/0183156 | A1* | 6/2016 | Chin | H04W 36/022 |
| | | | | 370/331 |
| 2016/0352924 | A1* | 12/2016 | Senarath | H04M 15/8016 |
| 2017/0019945 | A1* | 1/2017 | Chiba | H04W 74/0833 |
| 2017/0070923 | A1* | 3/2017 | Li | H04W 36/0066 |
| 2017/0332282 | A1* | 11/2017 | Dao | H04L 1/0002 |
| 2018/0220478 | A1* | 8/2018 | Zhu | H04L 45/306 |
| 2018/0288784 | A1* | 10/2018 | Stojanovski | H04W 76/10 |
| 2018/0376384 | A1* | 12/2018 | Youn | H04W 36/0022 |
| 2019/0174377 | A1* | 6/2019 | Decarreau | H04W 28/06 |
| 2019/0246316 | A1* | 8/2019 | Jung | H04B 17/318 |

FOREIGN PATENT DOCUMENTS

| | | |
|---|---|---|
| WO | WO 2011/162781 A1 | 12/2011 |
| WO | WO 2011/162782 A1 | 12/2011 |
| WO | WO 2018/232605 A1 | 12/2018 |

OTHER PUBLICATIONS

"Nx-based interworking procedures from QoS point of view", NTT DOCOMO, SA WG2 Meeting #119, S2-170936, Feb. 2017, pp. 1-4.

"TS 23.502: Nx-based Handover procedure", NTT Docomo, SA WG2 Meeting #119, S2-170937, Feb. 2017, pp. 1-8.

Extended European Search Report dated Dec. 11, 2019, in Patent Application No. 18751136.5, 10 pages.

Taiwanese Office Action and Search Report dated Dec. 11, 2019, in Patent Application No. 108104040, 13 pages (with English Translation of Category of Cited Documents).

* cited by examiner

METHOD AND APPARATUS FOR INTER-SYSTEM HANDOVER IN WIRELESS COMMUNICATION

INCORPORATION BY REFERENCE

This present disclosure claims the benefit of U.S. Provisional Application No. 62/457,198, "QoS Coordination during Inter-System" filed on Feb. 10, 2017, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless communications, a wireless communication device, such as a cellular phone, may need to switch from one network to another because of degradation in the received signal power from one network. To provide ubiquitous coverage, it is essential to ensure that the wireless communication device can access the service as the wireless communication device moves across the network coverage area.

SUMMARY

Aspects of the disclosure provide a processing circuit in an electronic apparatus configured to switch the electronic apparatus during an inter-system handover (HO) process from a source network system to a target network system. The processing circuit can include an inter-system HO signal processing module and a mapping module. The inter-system HO signal processing module can be configured to obtain a mapping relationship between a set of source bearers associated with the source network system and a first set of target bearers associated with the target network system based on quality of service (QoS) characteristics associated with the set of source bearers and the first set of target bearers. The mapping module can be configured to obtain a second set of target bearers based on resources allocated to the first set of target bearers by the target network system and to obtain a third set of target bearers that is based on the first and second set of target bearers.

In an embodiment, the set of source bearers can refer to one or more source session bearers configured to transmit data packets between the electronic apparatus and the source network system based on QoS characteristics of respective source session bearers. The first set of target bearers can refer to one or more target session bearers configured to transmit data packets between the electronic apparatus and the target network system based on QoS characteristics of respective target session bearers and one or more target access bearers between the electronic apparatus and a target access network of the target network system. Each target access bearer can be configured to transmit an aggregate of data packets of one or more target session bearers associated with the target access bearer.

In an embodiment, the source network system is a fourth generation (4G) wireless communication network system, the target network system is a fifth generation (5G) wireless communication network system. Accordingly, the set of source bearers can refer to one or more evolved packet system (EPS) bearers associated with respective QoS class identifier (QCI), and the first set of target bearers can refer to one or more QoS flows associated with QoS flow identifier (QFI) and one or more data radio bearers. Each data radio bearer can be configured to transmit an aggregate of data packets from one or more QoS flows associated with the data radio bearer.

In an embodiment, the set of source bearers can refer to one or more source session bearers and one or more source access bearers between the electronic apparatus and a source access network of the source network system. Each source access bearer can be configured to transmit an aggregate of data packets from one or more source session bearers associated with the source access bearer. The first set of target bearers can refer to one or more target session bearers.

In an embodiment, the source network system is a 5G system, the target network system is a 40 system. Accordingly, the set of source bearers can refer to one or more QoS flows and one or more data radio bearers associated with the one or more QoS flows, and the first set of target bearers can refer to one or more EPS bearers.

In an embodiment, the mapping relationship can be obtained based on mapping signals received from the source network system. For example, the mapping signals, received from a 5G system, can include EPS bearer identifier corresponding to a QoS flow of the set of source bearers. In an example, the mapping signals can be received when the QoS flow is established. In another example, the mapping signals can be received when a packet data unit (PDU) session is established. In another example, the mapping signals can be changed in PDU session Modification procedure.

In an embodiment, the mapping relationship can be obtained based on pre-defined mapping rules stored on the electronic apparatus.

In an embodiment, the processing circuit can further include a routing module configured to route data packets from the set of source bearers to the third set of target bearers.

In an example, the set of source bearers can be included in a source session established between the electronic apparatus and the source network system before the inter-system HO process. The third set of target bearers can be included in a target session established between the electronic apparatus and the target network system after the inter-system HO process.

In an embodiment, reflective QoS attribute of a 5G system can be disabled in the third set of target bearers.

Aspects of the disclosure provide a method of switching an electronic apparatus during an inter-system HO process from a source network system to a target network system. The method can include obtaining a mapping relationship between a set of source bearers associated with the source network system and a first set of target bearers associated with the target network system based on QoS characteristics associated with the set of source bearers and the first set of target bearers. The method can further include obtaining a second set of target bearers based on resources allocated to the first set of target bearers by the target network system, and generating a third set of target bearers that is based on the first and second set of target bearers.

In an embodiment, the method can further include receiving mapping signals from the source network system and processing the mapping signals to obtain the mapping relationship.

In an embodiment, the method can further include storing pre-defined mapping rules and processing the pre-defined mapping rules to obtain the mapping relationship.

In an embodiment, the third set of target bearers can include a target default session bearer configured to transmit data packets not transmitted by other target session bearers. In an example, the target default session bearer can be a default EPS bearer. In another example, the target default session bearer can be a dedicated EPS bearer if a QoS flow does not have the default QoS rule. In another example, the target default session bearer can be a QoS flow of a default QoS rule.

In an embodiment, the method can further include routing data packets from the set of source bearers to the third set of target bearers.

In an embodiment, the method can further include routing data packets of a QoS flow to a default EPS bearer if the EPS bearer corresponding to the QoS flow is not successfully established during inter-system handover process.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
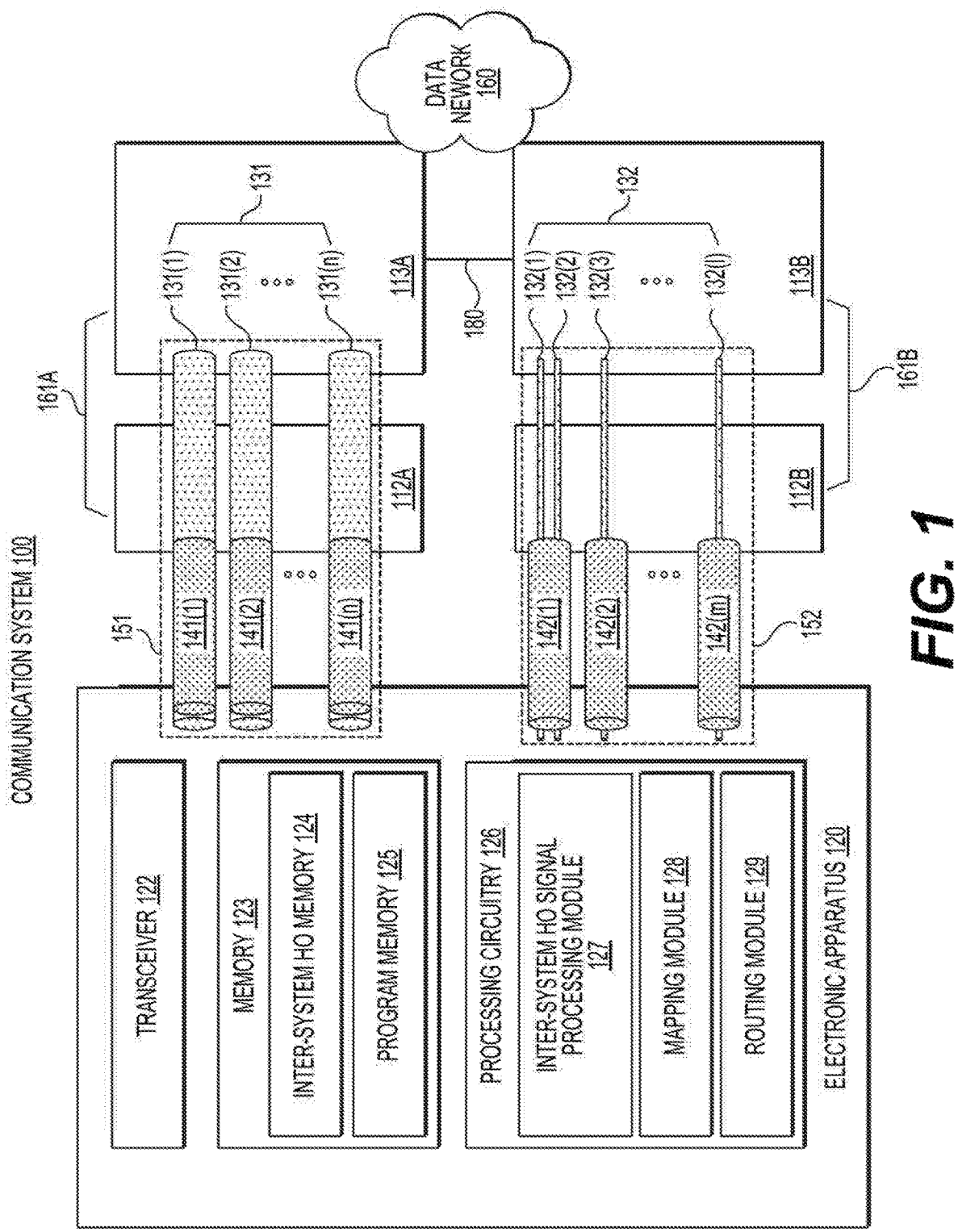
FIG. 1 shows an exemplary block diagram of a communication system 100 according to an embodiment of the disclosure.

FIG. 1 shows an exemplary block diagram of a communication system 100 according to an embodiment of the disclosure. As shown, the communication system 100 can include an electronic apparatus 120, two network systems including a first and second network system 161A-B, and a data network 160 providing Internet access to the electronic apparatus 120. In an embodiment, a first set of bearers associated with the first network system 161A and a second set of bearers associated with the second network system 161B, can be configured to transmit data packets between the electronic apparatus 120 and the respective first and second network system 161A-B according to quality of service (QoS) characteristics, such as QoS characteristics associated with the first and second set of bearers.

In an embodiment, an inter-system handover (HO) process can occur due to, for example, mobility of the electronic apparatus 120. The inter-system HO process can instruct the electronic apparatus 120 to switch connection from a current source network system connected to the electronic apparatus 120 to a target network system to be connected to the electronic apparatus 120 after the inter-system HO. In an example, the source network system can be the first network system 161A and the target network system can be the second network system 161B. As a result, a set of source bearers associated with the source network system, such as the first set of bearers, can be mapped to a set of target bearers associated with the target network system, such as the second set of bearers. Accordingly, data packets can be routed from the set of source bearers to the set of target bearers. According to aspects of the disclosure, to provide suitable quality of service in transmitting data packets, an inter-system HO QoS coordination process including mapping the set of source bearers to the set of target bearers can be implemented where the set of source and target bearers can have similar QoS characteristics. Mapping relationship between the set of source and target bearers based on the QoS characteristics can be obtained by the electronic apparatus 120. In an embodiment, mapping signals carrying mapping information can be received and processed by the electronic apparatus 120 to generate the mapping relationship.

The first network system 161A and the second network system 161B can be any suitable network capable of transmitting data between devices, such as between the electronic apparatus 120 and the data network 160. For example, the first and second network system 161A and 161B can be a service provider network including a wireless communication service provider network, a mobile service provider network, a machine type communication (MTC) network, a wired broadband network, and the like. The first network system 161A can further include a first access network 112A and a first core network 113A. The second network system 161B can include a second access network 112B and a second core network 113B. The first and second core network 113A and 113B can be connected to the data network 160. For purposes of this disclosure, the network systems are service provider networks.

The first and second access network 112A and 112B can be any suitable access network connecting the electronic apparatus 120 to the respective first and second core network 113A-113B using any suitable network technology, such as wired, wireless, fiber optical network, any suitable combination thereof, and the like. In an example, the first and second access network 112A-112B can be a radio access network (RAN), such as Global System for Mobile Communications (GSM) RAN (GRAN), Universal Mobile Telecommunications System (UMTS) RAN (UTRAN), Evolved Universal Terrestrial RAN (EUTRAN), fifth generation (5G) RAN compliant with the 5G standard developed by 3rd Generation Partnership Project (3GPP), and the like. The first and second access network 112A-112B can include a plurality of access network nodes, such as base stations, Node Bs (NBs), evolved Node Bs (eNBs), 5G next generation node Bs (gNBs), and the like.

The first and second core network 113A-113B can be any suitable network configured to provide services, such as authentication, accounting, QoS handling, and the like, to the electronic apparatus 120. In an example, the first and second core network 113A-113B can be a GSM/(General Packet Radio Service) GPRS core network used for GSM and Wideband Code Division Multiple Access (WCDMA), a core network compliant with the 4th Generation (40) standard developed by 3GPP such as an evolved packet core (EPC), a 5G core network (5GC) compliant with the 5G standard developed by 3GPP, and the like. The first and second core network 113 can include a plurality of core network nodes, such as mobility management entity (MME), serving gateway (S-GW), packet data network (PDN) gateway (P-GW), home subscriber service (HSS) node, and the like used in the EPC, as well as access and mobility function (AMF), session management function (SMF), user plane function (UPF), user data management (UDM), and the like used in the 5GC.

In an embodiment, the first and second network system 161A-161B can be implemented using hardware components, software components, firmware components, any suitable combination thereof, and the like. The access network and core network nodes within a network system, such as the first and second network system 161A-161B, can be coupled together by any suitable network technology, such as wired, wireless, fiber optical network, any suitable combination thereof, and the like. Further, the first and second network system 161A-161B can also be connected via any suitable network technology, such as wired, wireless, fiber optical network, any suitable combination thereof, and the like. In an example, the first network system 161A can be a 4G system (4GS) such as an evolved packet system (EPS) including an EUTRAN and an EPC, and the second network system 161B can be a 5G system (5GS) including a 5G RAN and a 5GC. In another example, the second network system 161B can be a 5GS including an EUTRAN and a 5GC. The first and second network system 161A-161B can be connected, for example, via a N26 interface 180 between the MME in the EPC and the AMF in the 5GC. In addition, the SGW in the EPC can also be connected to the UPF in the 5GC.

In an embodiment, one or more first sessions connecting the electronic apparatus 120 and the first core network 113A, such as a first session 151, can be employed to provide services to the electronic apparatus 120. The first session 151 can include one or more first session bearers 131 configured to transmit data packets between the electronic apparatus 120 and the first core network 113A. One of the first session bearers 131 is a first default session bearer. Data packets can be transmitted over each first session bearer 131 according to QoS characteristics of the respective first session bearer 131, a first bearer QoS classified by a respective first bearer QoS identifier. The first bearer QoS can include packet forwarding characteristics, such as a type of the first session bearer 131, a priority level indicating a priority in scheduling resources, a packet delay budget, a packet loss rate, and the like. When there are multiple first session bearers 131 in the first session 151, the first bearer QoS are different, reflected by the first bearer QoS identifiers being different. In an example, the first session bearers 131 can be EPS bearers related to a 4GS.

A second session 152 and one or more second session bearers 132 associated with respective second bearer QoS classified by a second bearer QoS identifier of the second network system 161B are related to each other in a similar manner to the first session 151, and the one or more first session bearers 131 associated with the respective first bearer QoS classified by the first bearer QoS identifier. Thus, a detailed description is omitted. Similarly, one of the second session bearers 132 is a second default session bearer. In an embodiment, a default session bearer, such as the first default session bearer and the second default session bearer, can be configured to transmit data packets not transmitted by other session bearers, thus, data packets for the other session bearers can be routed to the default session bearer. In an example, the second session bearers 132 can be QoS flows related to a 5GS.

The first and second sessions, such as the first and second session 151-152, can be based on any suitable protocols, such as internet protocol (IP) and non-IP, IP version 4 (IPv4), IP version 6 (IPv6), Ethernet, Unstructured used in 5GC, and the like.

The difference between the first and second set of bearers is discussed below. In the first session 151, each first session bearer 131(n) can be associated with a first access bearer 141(n) connecting the electronic apparatus 120 and the first access network 112A. Data packets transmitted over the first access bearer 141(n) are also transmitted over the first session bearer 131(n) according to the respective first bearer QoS.

In the second session 152, multiple second session bearers 132 can be associated with a second access bearer 142 connecting the electronic apparatus 120 and the second access network 112B. When multiple second session bearers 132 are associated with a second access bearer 142(n), data packets transmitted over the second access bearer 142(n) are an aggregate of data packets transmitted over the multiple second session bearers 132 according to different second bearer QoS. For example, data packets transmitted over the second access bearer 142(1) are an aggregate of data packets transmitted over the second session bearers 132(1)-(2) according to different second bearer QoS.

Accordingly, the first set of bearers including the one or more first session and access bearers 131 and 141 can be determined in one step, for example, by matching data packets to the one or more first session bearers 131 based on the QoS characteristics. Further, the first set of bearers can be specified by, for example, the one or more first session bearers 131. On the other hand, the second set of bearers including the one or more second session and access bearers 132 and 142 can be determined in two steps, for example, by matching data packets to the one or more second session bearers 132 based on the QoS characteristics, such as QoS rules associated with a respective second bearer QoS, and subsequently matching the one or more second session bearers 132 to the respective second access bearers 142. Further, the second set of bearers can be specified by, for example, the one or more second session and access bearers 132 and 142.

In an example, uplink data packets transmitted from the electronic apparatus 120 to the second network system 161B can be matched to a second session bearer based on downlink data packets received from the second network system 161B using reflective QoS rule in a 5GS.

In an example, the first network system 161A can be a 4GS with a RAN, thus, the first session 151 can be an EPS session, i.e., a PDN connection. In addition, each first session and access bearer 131 and 141 can be an EPS bearer and a first radio bearer (RB), respectively. The first default session bearer can be a default EPS bearer. In an example, the second network system 161B can be a 5GS with a 5G RAN, thus, the second session 152 can be a packet data unit (PDU) session. In addition, each second session and access bearer 132 and 142 can be a QoS flow and a second RB, respectively. The second default session bearer can be a QoS flow of a default QoS rule. In an example, the default QoS rule is required for every PDU session and associated with the QoS flow of the default QoS rule.

As described above, the inter-system HO process is associated with a source and target network system. When the source network system is the first network system 161A and the target network system is the second network system 161B, a source session is the first session 151, a set of source bearers is the first set of bearers, one or more source session bearers are the one or more first session bearers 131, source bearer QoS is the first bearer QoS, one or more source bearer QoS identifiers are the one or more first bearer QoS identifiers, and one or more source access bearers are the one or more first access bearers 141. Similarly, a target session is the second session 152, a set of target bearers is the second set of bearers, one or more target session bearers are the one or more second session bearers 132, target bearer QoS is the second bearer QoS, one or more target bearer QoS identifiers are the one or more second bearer QoS identifiers, and one or more target access bearers are the one or more second access bearers 142.

When the source network system is the second network system 161B and the target network system is the first network system 161A, a source session is the second session 152, a set of source bearers is the second set of bearers, one or more source session bearers are the one or more second session bearers 132, source bearer QoS is the second bearer QoS, one or more source bearer QoS identifiers are the one or more second bearer QoS identifiers, and one or more source access bearers are the one or more second access bearers 142. Similarly, a target session is the first session 151, a set of target bearers is the first set of bearers, one or more target session bearers are the one or more first session bearers 131, target bearer QoS is the first bearer QoS, one or more target bearer QoS identifiers are the one or more first bearer QoS identifiers, and one or more target access bearers are the one or more first access bearers 141.

According to aspects of the disclosure, the electronic apparatus 120 can be configured to implement the inter-system HO QoS coordination process based on inter-system HO requirements including the QoS characteristics. In an embodiment, the electronic apparatus 120 can obtain the mapping relationship between the set of source bearers in the source session and the set of target bearers in the target session based on the QoS characteristics. The mapping relationship can be obtained from the mapping signals, pre-defined mapping rules, any combination thereof, and the like.

According to an aspect of the disclosure, the mapping signals can be received from the source network system, such as the second network system 161B, a 5GS, and the like, and processed to generate the mapping relationship. In an example, the mapping signals can be embedded in a message transmitted from a 5GC to the electronic apparatus 120 when a PDU session is established or when a QoS flow is established. In an example, the mapping signals can be transmitted from a 5GC to the electronic apparatus 120 when a PDU session is modified. To establish the PDU session, the electronic apparatus 120 sends a PDU Session Establishment Request message to the 5GS. Subsequently, the electronic apparatus 120 receives a PDU Session Establishment Accept message from the 5GS. In an example, the PDU Session Establishment Accept message includes the mapping signals as follows: an EPS bearer ID (EB1) of an EPS bearer (EB) corresponding to the respective QoS flow.

In another embodiment, the pre-defined mapping rules can be stored in the electronic apparatus 120 and processed to generate the mapping relationship, for example when the source network system is the first network system 161A, a 40GS, an EPS, and the like. Subsequently, the electronic apparatus 120 can be configured to map the set of source bearers to the set of target bearers based on the mapping relationship, resource allocation for the set of target bearers, and the like. The electronic apparatus 120 can then route data packets from the set of source bearers to the set of target bearers.

The mapping relationship can differ depending on the source and target network systems because of the difference between the first and second set of bearers described above. In an example, the source and target network systems are the second and first network systems 161B and 161A, respectively, thus the mapping relationship can specify how the one or more second session bearers 132 can be mapped to the one or more first session bearers 131. In another example, the source and target network systems are the first and second network systems 161A and 161B, respectively, thus the mapping relationship can specify how the one or more first session bearers 131 can be mapped to the second set of bearers including the one or more second session bearers 132 and the one or more second access bearers 142.

The electronic apparatus 120 can be any suitable electronic apparatus configured to communicate with the first and second network system 161A-161B and receive Internet access from the data network 160. In an example, the electronic apparatus 120 can be configured to communicate with a 4G system, such as an EPS including an EUTRAN and an EPC, as well as a 5GS including a 5G RAN or EUTRAN and a 5GC. In an example, the electronic apparatus 120 is a terminal device used by an end-user for mobile telecommunication, such as a cell phone, a smart phone, a tablet computer, and the like. In another example, the electronic apparatus 120 is a MTC device (user equipment, UE), such as a wireless meter, a wireless sensor, a wireless actuator, and the like.

The electronic apparatus 120 can include a transceiver 122, a memory 123, a processing circuitry 126, and the like. The transceiver 122 can communicate with the first and second network system 161A-161B via, for example, the first and second access network 112A-112B, respectively. In an example, the transceiver 122 can communicate wirelessly with an access network node of the first or second access network 112A or 112B, such as an eNB, a gNB, and the like. According to an aspect of the disclosure, the transceiver 122 can receive the mapping signals from, for example, the source network system, such as the second network system 161B.

The memory 123 can include an inter-system HO memory 124 and a program memory 125. The inter-system HO memory 124 can be configured to store any information used in the inter-system HO QoS coordination process including, for example, the mapping relationship and the pre-defined mapping rules. The program memory 125 can be configured to store instructions to control operations of the electronic apparatus 120. The memory 123 can be any suitable memory including non-volatile memory such as one or more non-volatile memory chips, volatile memory such as random access memory (RAM), or any suitable combination thereof.

The processing circuitry 126 can be any device configured to implement the inter-system HO QoS coordination process. The processing circuitry 126 can include an inter-system HO signal processing module 127, a mapping module 128, and a routing module 129. The inter-system HO signal processing module 127 can be configured to process signals used in the inter-system HO QoS coordination process including, for example, the mapping signals and the pre-defined mapping rules, and obtain the mapping relationship.

The mapping module 128 can map the set of source bearers to the set of target bearers based on information including the mapping relationship, the resource allocation for the set of target bearers, and the like. The routing module 129 can route data packets from the set of source bearers to the set of target bearers.

In an embodiment, the electronic apparatus 120 can be a system-on chip (SOC) where all the components, such as the transceiver 122, the memory 123, and the processing circuitry 126, are located on a single integrated circuit (IC) chip. Alternatively, the components in the electronic apparatus 120 can be distributed across multiple ICs. In an embodiment, the processing circuitry 126 can be implemented using hardware components, software components, firmware components, or any combination thereof. In an example, the software implementing the inter-system HO QoS coordination can be stored in the program memory 125 and be executed by hardware components located in the processing circuitry 126.

During operation, the electronic apparatus 120 is configured to switch connection from a current source network system to a target network system. In an example, the source network system is the second network system 161B and the target network system is the first network system 161A. Further, the source network system is a 5GS including, for example, a 5G RAN or EUTRAN and a 5GC, the target network system is a 4GS such as an EPS including an EUTRAN and an EPC, and the source and target network system are connected via the N26 interface 180. Data packets are transmitted between the electronic apparatus 120 and the second network system 161B via the second session 152 including the second session bearers 132(1)-(3).

In an example, the mapping signals are received by the transceiver 122 from the second network system 161B when the second session 152 is established. The inter-system HO signal processing circuitry 127 is configured to process the mapping signals and generate the mapping relationship as follows: the second session bearers 132(1)-(2) is mapped to the first session bearer 131(2), and the second session bearer 132(3) is mapped to the first session bearer 131(1). Further, the first session bearer 131(2) is the first default session bearer.

The mapping module 128 is configured to map the set of source bearers to the set of target bearers. In an example, the first session bearer 131(1) is not established in the first network system 161A, thus the set of target bearers includes the first session bearer 131(2). Subsequently, the routing module 129 routes data packets from the source session bearers 132(1)-(2) to the first session bearer 131(2) based on the mapping relationship. Further, data packets from the second source bearer 132(3) are routed to the first session bearer 131(2) because the first session bearer 131(1) is not established and the first session bearer 131(2) is the first default session bearer.

Figure 2:
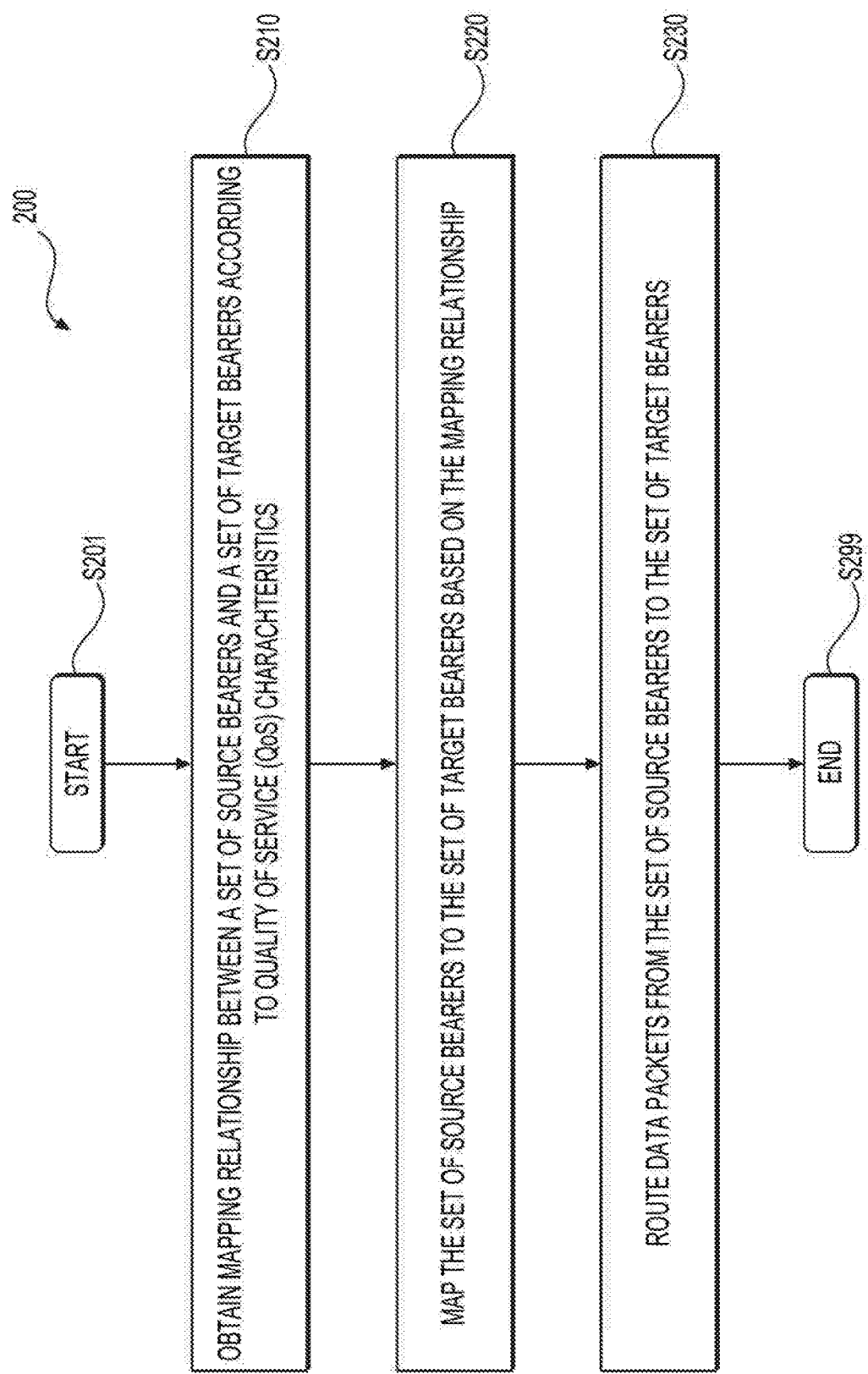
FIG. 2 shows a flow chart outlining an exemplary process 200 according to an embodiment of the disclosure.

FIG. 2 shows a flow chart outlining an exemplary process 200 according to an embodiment of the disclosure. In an example shown in FIG. 1, the process 200 can be executed by the communication system 100 to implement an inter-system HO QoS coordination process where the source and target network system can be one of the first and second network system 161A-B, respectively.

The process starts at S201. The electronic apparatus is connected to the source network system via, for example, the source session having the set of source bearers. In an example shown in FIG. 1, the source session can be the first or second session 151 or 152 when the source network system is the first or second network system 161A or 161B, respectively. The process then proceeds to S210.

At S210, a mapping relationship is obtained between the set of source bearers and the set of target bearers based on the QoS characteristics. In an embodiment, a mapping relationship is obtained between the set of source bearers in the source session and the set of target bearers in the target session based on the QoS characteristics. In an example shown in FIG. 1, the set of target bearers can be the first or second set of bearers when the target network system is the first or second network system 161A or 161B, respectively.

In an embodiment, the mapping relationship can specify relationship of the set of source and target bearers. In an example, the set of source bearers include the second session bearers 132(1)-(3), and the set of target bearers include the first session bearers 131(1)-(2) as described above. The mapping relationship can specify the following relationship: the second session bearer 132(1)-(2) mapped to the first session bearer 131(2), and the second session bearer 132(3) mapped to the first session bearer 131(1). In an example, the mapping relationship can be stored in a look-up table in the inter-system HO memory 124.

In an embodiment, each access and session bear can be allocated a respective bearer identifier (ID) by a network system. For example, the one or more first session and access bearers 131 and 141, and the one or more second session and access bearers 132 and 142 can be allocated one or more first session and access bearer IDs (SBIs and ABIs), and one or more second SBIs and ABIs, respectively. In an example, the mapping relationship can specify relationship of the set of source and target bearers using the respective bearer ID.

The mapping relationship can be obtained from the mapping signals, the pre-defined mapping rules, any combination thereof, and the like, as described above. In one embodiment, the mapping signals can be received from the source network system and processed to generate the mapping relationship. In an example shown in FIG. 1, the mapping signals can be received by the transceiver 122 and processed by the processing circuitry 126. The mapping signals can be received, for example, when the source session is established. In an example, the mapping signals can include the mapping relationship. In another example, the mapping signal can include the source bearer QoS. The mapping relationship can be generated based on the set of source bearers and the source bearer QoS.

In another embodiment, the pre-defined mapping rules can be stored in the electronic apparatus 120, such as the inter-system HO memory 124. In an example, the pre-defined mapping rules can include the mapping relationship. In another example, the pre-defined mapping rules can include relationship of the source and target bearer QoS, such as relationship of the source and target bearer QoS identifier. In an example, the source bearer QoS identifier is a 5G QoS indicator (5QI) used in a 5GS, and the target bearer QoS identifier is a QoS class identifier (QCI) used in an EPS. As a result, the mapping relationship can be determined based on the source bearers and the pre-defined mapping rules relating the source and target bearer QoS.

At S220, the set of source bearers can be mapped to the set of target bearers based on, for example, the mapping relationship, the resource allocation for the set of target bearers, and the like. In an embodiment, a first set of target bearers to be established in the target network system can be determined from the mapping relationship. In an example, the source network system is the second network system 161B. The mapping relationship includes: the second session bearer 132(1)-(2) mapped to the first session bearer 131(2), and the second session bearer 132(3) mapped to the first session bearer 131(1). Therefore, the first set of target bearers includes the first session bearers 131(1)-(2), and the first session bearer 131(2) is the target default session bearer.

The electronic apparatus 120 can send the information of the first set of target bearers to the target network system. In an example, depending on the resource allocation of the target network system, the first set of target bearers can include a third set of target bearers, i.e., the first set of target bearers established by the target network system, and a fourth set of target bearers, i.e., the first set of target bearers not established by the target network system.

A second set of target bearers can be obtained, for example, based on resources allocated to the first set of target bearers by the target network system. However, the second and first set of target bearers can be different due to, for example, the resource allocation for the first set of target bearers. The resource allocation can include allocating suitable resources for establishing the first set of target bearers. In an example, the target network system is a 4GS such as an EPS, and the resource allocation can be implemented using, for example, long term evolution (LTE) radio resource control (RRC) configuration. In an example, the second set of target bearers includes the first session bearer 131(2), different from the first set of target bearers including the first session bearers 131(1)-(2), because the target network system fails to allocate resources for the first access bearer 141(1) associated with the first session bearer 131(1). Note that the second set of target bearers can also include one or more session or access bearers not included in the first set of target bearers.

In an embodiment, the third set of target bearers can be determined based on the first and second set of target bearers. In an embodiment, the third set of target bearers is included in the first and second set of target bearers. In an example, the first and second set of target bearers can be compared by the electronic apparatus to generate the third set of target bearers. In the example described above, the third set of target bearers includes the first session bearer 131(2).

In an embodiment, the fourth set of target bearers can be determined based on the first and third set of target bearers. For example, the fourth set of target bearers is included in the first set of target bearers, but not in the third set of target bearers. In an example described above, the fourth set of target bearers includes the first session bearer 131(1) not established by the target network system.

In an embodiment, source session bearers in the set of source bearers that are mapped to the fourth set of target bearers can be remapped to the target default session bearer. In an example, the second session bearer 132(3), mapped to the fourth set of target bearers, the first session bearer 131(1), can be remapped to the target default session bearer 131(2), also the first session bearer 131(2).

In an embodiment, the third set of target bearers can include the target default session bearer. Subsequently, the set of source bearers, such as the second session bearers 132(1)-(3), can be mapped to the third set of target bearers including the target default session bearer, such as the first session bearer 131(2).

At S230, data packets can be routed from the set of source bearers to the set of the target bearers. For example, data packets can be routed to the third set of target bearers based on the mapping relationship. In an embodiment, the target default session bearer can be configured to transmit data packets not transmitted by other target session bearers, thus, data packets for the fourth set of target bearers can be routed to the target default session bearer.

For example, data packets are routed from the second session bearers 132(1)-(2) to the first session bearer 131(2) according to the mapping relationship. Further, data packets are routed from the second session bearers 132(3) to the first session bearer 131(2), the target default session bearer. The process then proceeds to S299, and terminates.

Figure 3:
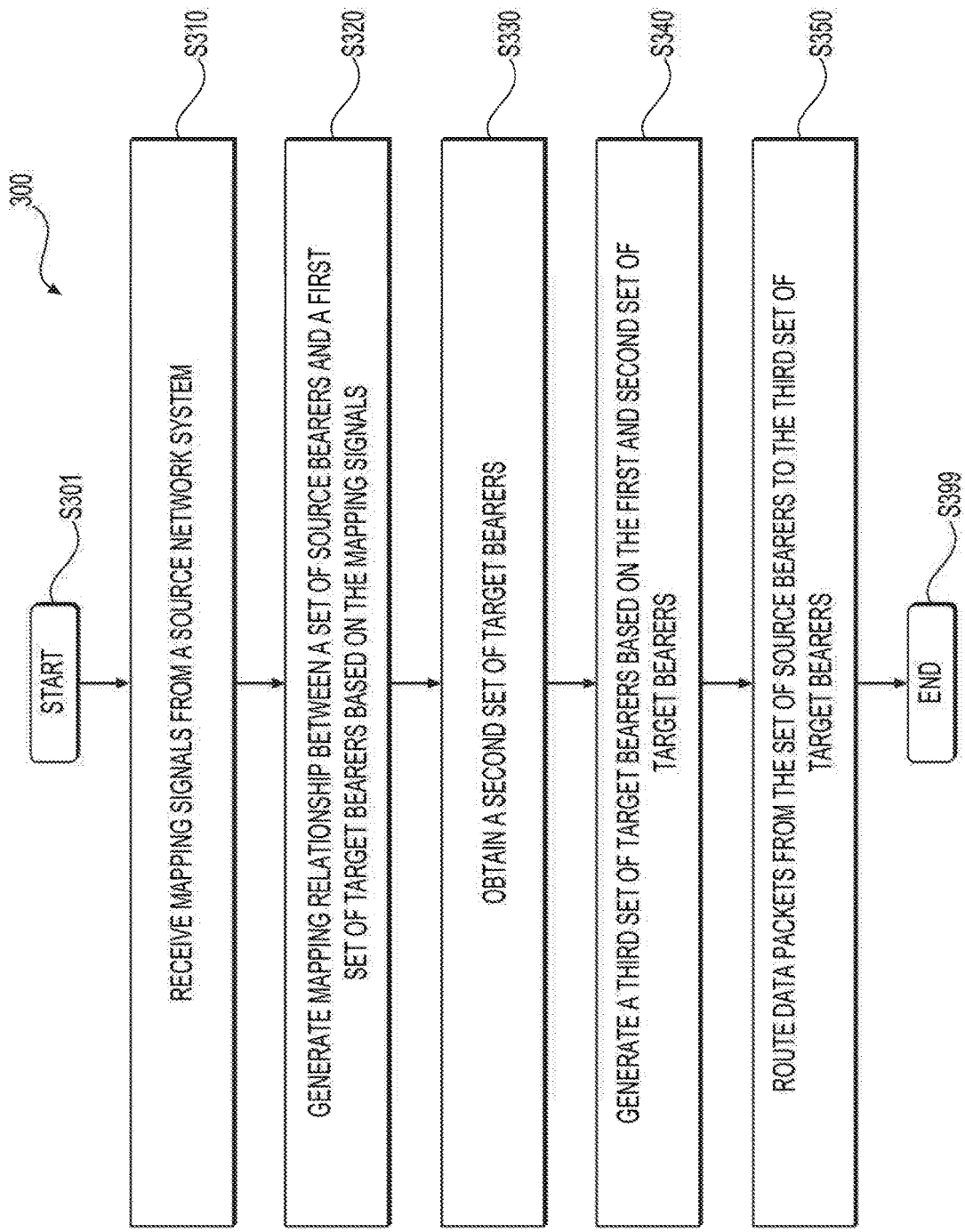
FIG. 3 shows a flow chart outlining an exemplary process 300 according to an embodiment of the disclosure.
Figure 4:
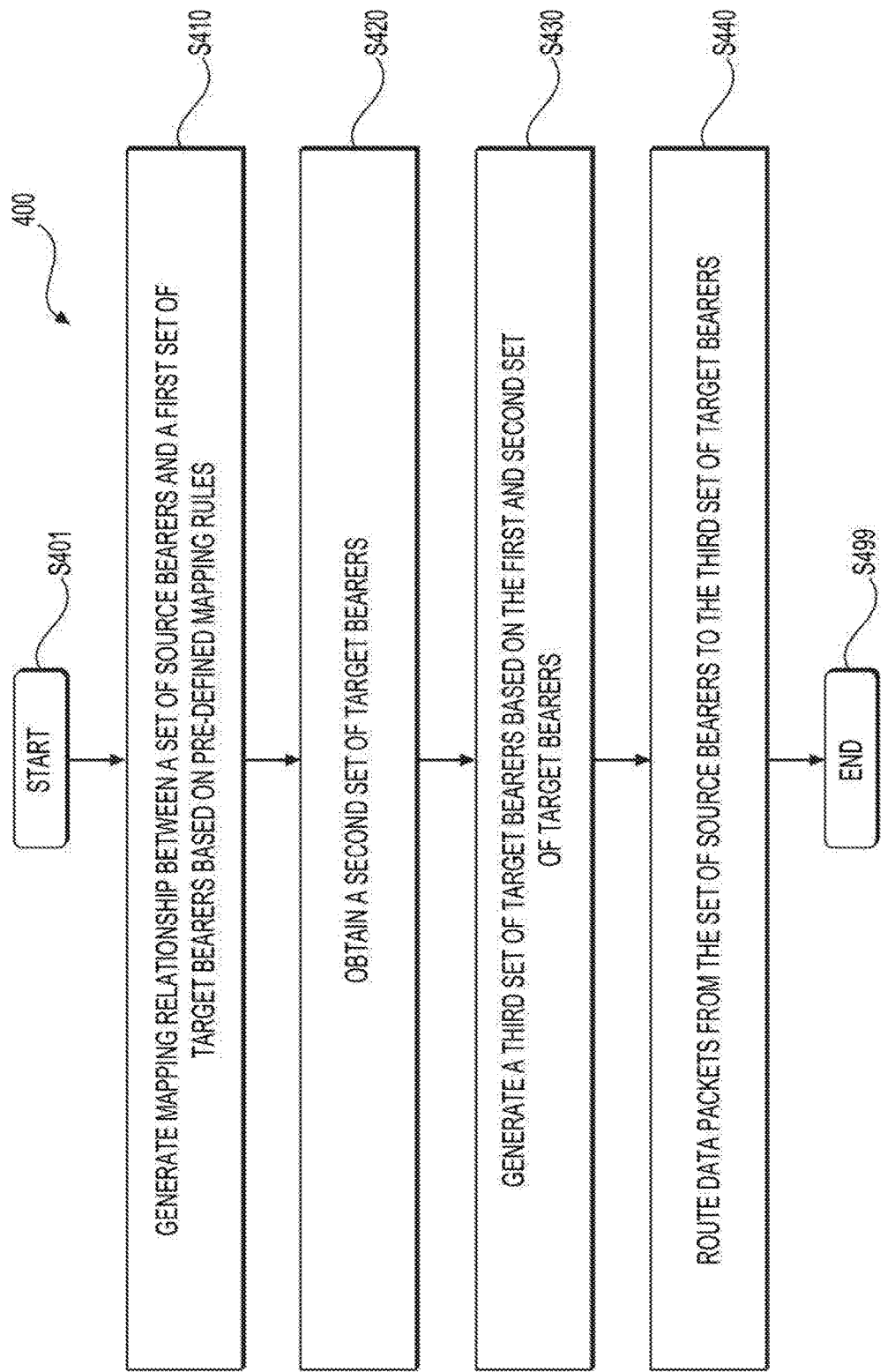
FIG. 4 shows a flow chart outlining an exemplary process 400 according to an embodiment of the disclosure.

FIGS. 3 and 4 show exemplary processes where the mapping relationship can be obtained based on the mapping signals received from the source network system (FIG. 3) or the pre-defined mapping rules stored in the electronic apparatus 120 (FIG. 4). In an example, the source and target network system in FIG. 3 can be the second and first network system 161B and 161A, respectively, resulting in the mapping relationship of the one or more second and first session bearers 132 and 131. In another example, the source and target network system in FIG. 4 can be the first and second network system 161A and 161B, respectively, resulting in the mapping relationship of the one or more first session bearers 131 and the second set of bearers including the one or more second session and access bearers 132 and 142.

FIG. 3 shows a flow chart outlining an exemplary process 300 according to an embodiment of the disclosure. In an example shown in FIG. 1, the process 300 can be executed by the electronic apparatus 120 to implement an inter-system HO QoS coordination process where the source and target network system are the second and first network system 161B and 161A, respectively.

The process starts at S301 and proceeds to S310. At S310, mapping signals can be received from the source network system. In an example, the source and target network system are the second and first network system 161B and 161A, respectively in FIG. 1. The mapping signals are received from the second network system 161B when the second session 152 is established. Further, the set of source bearers includes the second session bearers 132(1)-(3). In an example, the mapping signals include the first session bearer 131(1) corresponding to the second session bearer 132(3) and the first session bearer 131(2) corresponding to the second session bearer 132(1)-132(2).

At S320, a mapping relationship between the set of source bearers and the first set of target bearers can be generated based on the mapping signal. In an example, the source and target network system are the second and first network system 161B and 161A, respectively in FIG. 1. The mapping relationship is generated by the inter-system HO signal processing module 127 of the electronic apparatus 120. In an example, the first set of target bearers includes the first session bearers 131(1)-(2), and the first session bearer 131 (2) is also the target default session bearer. The mapping relationship includes: the second session bearers 132(1)-(2) mapped to the first session bearer 131(2), and the second session bearer 132(3) mapped to the first session bearer 131(1).

At S330, a second set of target bearers can be obtained from the target network system. In an example, the target network is the first network system 161A. The second set of target bearers is established by the first network system 161A according to the first set of target bearers, such as the first session bearers 131(1)-(2). In an example, the first network system 161A fails to allocate resources for the first access bearer 141(1) associated with the first session bearer 131(*l*), thus, the second set of target bearers includes the first session bearer 131(2), different from the first set of target bearers.

At S340, a third set of target bearers can be determined based on the first and second set of target bearers where the third set of target bearers represents target session and/or access bearers established according to the first set of target bearers. In an embodiment, third set of target bearers are included in the first and second set of target bearers and can be determined by comparing the first and second set of target bearers. In an example, the third set of target bearers is generated by the mapping module 128 of the electronic apparatus 120. In an example, the target network system is the first network system 161A, and the third set of target bearers includes the first session bearer 131(2).

A fourth set of target bearers can also be determined based on the first and third set of target bearers where the fourth set of target bearers represents target session and/or access bearers in the first set of target bearers not allocated resources by the target network system. In an example, the fourth set of target bearers is generated by the mapping module 128 of the electronic apparatus 120. In an example, the target network system is the first network system 161A, and the fourth set of target bearers includes the first session bearer 131(1).

In an embodiment, the third set of target bearers can include the target default session bearer. The fourth set of target bearers can be remapped to the target default session bearer. Therefore, source session bearers in the set of source bearers that are mapped to the fourth set of target bearers can be remapped to the target default session bearer. In an example, the second session bearer 132(3), mapped to the fourth set of target bearers, the first session bearer 131(1), can be remapped to the target default session bearer 131(2), also the first session bearer 131(2).

At S350, data packets can be routed from the set of source bearers to the third set of target bearers. In an example, the routing module 129 is configured to route data packets from the second session bearers 132(1)-(2) to the first session bearer 131(2) according to the mapping relationship. Further, data packets for the fourth set of the target bearers, such as data packets from the second session bearers 132(3), are routed to the target default session bearer, the first session bearer 131(2). The process then proceeds to S399, and terminates.

In an example, the electronic apparatus 120 and the first and second network system 161 in FIG. 1 are a UE, a 4GS such as an EPS, and a 5GS, respectively. The source and target network system are the 5GS and 4GS such as the EPS, respectively. The process 300 is executed by the UE to switch connection from the 5GS to the 4GS such as the EPS.

The process starts at S301 and proceeds to S310. At S310, the second session 152, a PDU session, is established. The PDU session includes three QoS flows (QF), i.e., QF1, QF2, and QF3 that are the second session bearers 132(1)-(3), respectively. Each QoS flow is classified by a respective QoS flow ID (QFI).

To establish the PDU session, the UE sends a PDU Session Establishment Request message to an AMF of the 5GC. Subsequently, the UE receives a PDU Session Establishment Accept message from the 5GS. Mapping signals are embedded in the PDU Session Establishment Accept message. In an example, the PDU Session Establishment Accept message includes the mapping signals as follows: an EPS bearer ID (EB1) of an EPS bearer (EB) corresponding to the respective QoS flow, such as an EBI2 of an EB2 corresponding to the QF1-QF2 and an EBI1 of an EB1 corresponding to the QF3. In an example, the QoS characteristics of the QF1, QF2, and EB2 are similar, and the QoS characteristics of the QF3 and EB1 are similar or identical.

At S320, a mapping relationship is extracted from the mapping signal by the inter-system HO signal processing module 127 of the UE. The mapping relationship includes relationship between the QoS flows and the EPS bearers: the QF1-QF2 mapped to the EBI2, and the QF3 mapped to the EBI1. A first set of target bearers includes the EB1 and EB2. Information of the EB1-EB2 is sent to the 4GS such as the EPS in order to establish the EB1-EB2.

In an example, a first radio bearer associated with the EB1 is not established and a second radio bearer associated with the EB2 is established by an EUTRAN of the 4GS. The EB2 is also the default EPS bearer. In an example, information related to the establishment of radio bearers can be sent via RRC. For example, RRC can indicate that the first radio bearer is not established and the second radio bearer is established. Upon receiving the information, non-access stratum (NAS) locally deactivates the EPS bearer context associated with the EB1 because the first radio bearer associated with the EB1 is not established. In an example, the UE sends to the EPS the Tracking Area Update (TAU) Request. Subsequently, the UE receives from the EPS a TAU Accept. NAS can indicate the EPS bearer context status in Tracking Area Update Accept message. The UE obtains that the first radio bearer is not established and the second radio bearer is established. The UE also locally deactivates the EPS bearer contexts associated with the EB1 from 4G Contexts. Meanwhile, the UE obtains the second set of target bearers: the EB2.

At S340, a third set of target bearers, included in both the first and second set of target bearers, is generated by comparing the first (the EB1-EB2) and second (the EB2) set of target bearers. The third set of target bearers is the EB2. Further, a fourth set of target bearers, is generated by comparing the first (the EB1-EB2) and third (the EB2) set of target bearers. The fourth set of target bearers includes the EB1. The EB1 is further remapped to the default EPS bearer, the EB2. In an example, the EB1 information is removed from the first set of target bearers. For example, the EB1 information is removed from a 4G QoS context. The QF3 information can be kept or removed from the 5G QoS context.

At S350, data packets are routed from the QF1-QF2 to the EB2 by the routing module 129 of the UE according to the mapping relationship. Further, data packets for the EB1 are routed from the QF3 to the target default session bearer, also the EB2. The process then proceeds to S399, and terminates.

Note that the process 300 can also be suitably adjusted and applied when a PDU session is modified.

FIG. 4 shows a flow chart outlining an exemplary process 400 according to an embodiment of the disclosure. In an example shown in FIG. 1, the process 400 can be executed by the electronic apparatus 120 to implement an inter-system HO QoS coordination process where the source network system is the first network system 161A and the target network system is the second network system 161B.

The process starts at S401 and proceeds to S410. At S410, a mapping relationship between a set of source bearers and a first set of target bearers can be determined based on the pre-defined mapping rules. In an example, the source network system is the first network system 161A and the target network system is the second network system 161B in FIG. 1. The mapping relationship is generated by the inter-system HO signal processing module 127 of the electronic apparatus 120. The set of source bearers includes the first session bearers 131(1)-(2). The pre-defined mapping rules can include relationship between a first session bearer and a second session bearer. In an example, the pre-defined mapping rules can include relationship of the source and target bearer QoS, such as relationship of the source and target bearer QoS identifier. In an example, the pre-defined mapping rules include a mapping relationship between a 5QI in a 5GS and a QCI in a 4GS. In an example, the pre-defined mapping rules can be stored in a look-up table. In an example, the first set of target bearers includes the second session bearers 132(1) and (3), and the second session bearer 132(3) is the target default session bearer. The mapping relationship includes: the first session bearer 131(1) mapped to the second session bearer 132(1), and the first session bearer 131(2) mapped to the second session bearer 132(3).

As described above, when the target network system is the second network system 161B, both a second session bearer and a second access bearer are specified in the inter-system HO process. In an example, the source network system, i.e., the first network system 161A, can include a relationship between a second session bearer and a second access bearer using RRC reconfiguration request. For example, the relationship can be that the second session bearer 132(1) is associated with the second access bearer 142(1), and the second session bearer 132(3) is associated with the second access bearer 142(2). As a result, the mapping relationship can be: the first session bearer 131(1) mapped to the second session bearer 132(1) associated with the second access bearer 142(1), and the first session bearer 131(2) mapped to the second session bearer 132(3) associated with the second access bearer 142(2). Therefore, the first set of target bearers can include both the target session bearers and the target access bearers.

At S420, a second set of target bearers can be obtained based on resources allocated to the first set of target session bearers by the target network system. In an example, the target network is the second network system 161B. The second set of target bearers is established by the second network system 161B according to the first set of target bearers, such as the second access bearer 142(2). In an example, the second network system 161B fails to allocate resources for the second access bearer 142(1), thus, the second set of target bearers includes the second session bearer 132(3) and the second access bearer 142(2), different from the first set of target bearers.

At S430, a third set of target bearers can be determined based on the first and second set of target bearers where the third set of target bearers represents target session and/or access bearers established according to the first set of target bearers. In an embodiment, third set of target bearers are included in the first and second set of target bearers and can be determined by comparing the first and second set of target bearers. In an example, the third set of target bearers is generated by the mapping module 128 of the electronic apparatus 120. In an example, the target network system is the second network system 161B, and the third set of target bearers includes the second session bearer 132(3) and the second access bearer 142(2). Further, the second session bearer 132(3) is the target default session bearer. The third set of target bearers includes the target default session bearer.

A fourth set of target bearers can also be determined based on the first and third set of target bearers where the fourth set of target bearers represents target session and/or access bearers in the first set of target bearers not allocated resources by the target network system. In an example, the fourth set of target bearers is generated by the mapping module 128 of the electronic apparatus 120. In an example, the target network system is the second network system 161B, and the fourth set of target bearers includes the second session bearer 132(1) and the second access bearer 142(1). The second session bearer 132(1) is remapped to the target default session bearer, the second session bearer 132(3).

At S440, data packets can be routed from the set of source bearers to the third set of target bearers. In an example, the routing module 129 is configured to route data packets from the first session bearer 131(2) to the second session bearer 132(3) according to the mapping relationship. Further, data packets for the fourth set of the target bearers, such as data packets from the first session bearer 131(1), are routed to the target default session bearer, the second session bearer 132(3). The process then proceeds to S499, and terminates.

In an example, the electronic apparatus 120 and the first and second network system 161 in FIG. 1 are a UE, a 4GS such as an EPS and a 5GS, respectively. The source and target network system are the 4GS and the 5GS, respectively. The process 400 is executed by the UE to switch connection from the 4GS to the 5GS.

The process starts at S401, and the first session 151, a PDN connection, is established. The PDN connection includes two EPS bearers, i.e., EB1 and EB2 that are the first session bearers 131(1)-(2), respectively. Each EPS bearer has respective QoS characteristics classified by a respective QoS class ID (QCI).

At S410, a mapping relationship is determined based on pre-defined mapping rules by the inter-system HO signal processing module 127 of the UE. In an example, the pre-defined mapping rules include a mapping relationship between a 5QI and a QCI. The mapping relationship includes relationship between the EPS bearers of the 4GS and QoS flows (QF) of the 5GS: the EB1 mapped to the QF1, i.e., the second session bearer 132(1), and the EB2 mapped to the QF2, i.e., the second session bearer 132(3).

Further, the 4GS such as the EPS includes a relationship between the QoS flow and a second radio bearer using RRC reconfiguration request transmitted from the 4GS to the UE. For example, the relationship can be: the QF1 is associated with the second RB1, i.e., the second access bearer 142(1), and the QF2 is associated with the second RB2, the second access bearer 142(2). As a result, the mapping relationship can be: the EB1 mapped to the QF1 associated with the second RB1, and the EB2 mapped to the QF2 associated with the second RB2. A first set of target bearers includes the QF1 associated with the second RB1 and the QF2 associated with the second RB2.

At S420, the UE sends to the Registration Area Update Request message including inquiries of status of the RB-RB2. Subsequently, the UE receives from the Registration Area Update Accept message including the status. In an example, the status includes that the RB1 is not established and the RB2 is established. Therefore, a second set of target bearers including the RB1 and the QF1 is obtained.

At S430, a third set of target bearers, included in both the first and second set of target bearers, is generated by comparing the first (the RB1-RB2) and second (the RB1) set of target bearers. The third set of target bearers is the RB1 and the QF1. Further, a fourth set of target bearers, is generated by comparing the first (the RB1-RB2) and third (the RB1) set of target bearers. The fourth set of target bearers includes the RB2 and the QF2.

In an example, the RB2 and the QF2 information is removed from the first set of target bearers. For example, the RB2 and the QF2 information is removed from a 5G QoS context. The EB2 information can be kept or removed from the 4G QoS context.

At S440, data packets are routed from the EB1 to the RB1 by the routing module 129 of the UE according to the mapping relationship. Further, data packets for the EB2 are routed to the target default session bearer, also the RB1. The process then proceeds to S499, and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What claimed is:

1. A processing circuit in an electronic apparatus configured to switch the electronic apparatus during an inter-system handover (HO) process from a source network system to a target network system, the processing circuit comprising:
an inter-system HO signal processing module configured to obtain a mapping relationship between a set of source bearers associated with the source network system and a first set of target bearers associated with the target network system based on quality of service (QoS) characteristics associated with the set of source bearers and the first set of target bearers; and
a mapping module configured to obtain a second set of target bearers based on resources allocated to the first set of target bearers by the target network system and to obtain a third set of target bearers that is based on the first and second set of target bearers,
wherein one of the set of source bearers and the first set of target bearers includes an access bearer and multiple session bearers that are associated with the access bearer.

2. The processing circuit in claim 1, wherein the set of source bearers includes a source session bearer configured to transmit data packets between the electronic apparatus and the source network system based on QoS characteristics of the source session bearer, the first set of target bearers includes multiple target session bearers configured to transmit data packets between the electronic apparatus and the target network system based on QoS characteristics of the respective target session bearers and a target access bearer between the electronic apparatus and a target access network of the target network system, the one of the set of source bearers and the first set of target bearers is the first set of target bearers, the multiple session bearers are the multiple target session bearers, and the access bearer is the target access bearer configured to transmit an aggregate of data packets of the multiple target session bearers.

3. The processing circuit of claim 2, wherein the source network system is a fourth generation (4G) wireless communication network system, the target network system is a fifth generation (5G) wireless communication network system, the source session bearer is an evolved packet system (EPS) bearer associated with a QoS class identifier (QCI), the multiple target session bearers are multiple QoS flows associated with respective QoS flow identifiers (QFIs), the target access bearer is a data radio bearer configured to transmit the aggregate of the data packets of the multiple QoS flows associated with the data radio bearer.

4. The processing circuit in claim 1, wherein the set of source bearers includes multiple source session bearers and a source access bearer between the electronic apparatus and a source access network of the source network system configured to transmit an aggregate of data packets from the multiple source session bearers associated with the source access bearer, and the first set of target bearers includes a target session bearer, the one of the set of source bearers and the first set of target bearers is the set of source bearers, the multiple session bearers are the multiple source session bearers, and the access bearer is the source access bearer.

5. The processing circuit of claim 4, wherein the source network system is a 5G system, the target network system is a 4G system, the multiple source session bearers are multiple QoS flows, the source access bearer is a data radio bearer associated with the multiple QoS flows, the target session bearer is an EPS bearer.

6. The processing circuit of claim 1, wherein the mapping relationship is obtained based on mapping signals received from the source network system.

7. The processing circuit of claim 6, wherein the source network system is a 5G system and the mapping signals, received from Hall the 5G system, include an EPS bearer identifier corresponding to a QoS flow of the set of source bearers when a PDU session is established or modified.

8. The processing circuit of claim 5, wherein the mapping module is further configured to:
obtain a list of radio bearers established by the 4G system; and
generate the second set of target bearers that is a list of EPS bearers associated with the list of radio bearers.

9. The processing circuit of claim 1, wherein the mapping relationship is obtained based on pre-defined mapping rules stored on the electronic apparatus.

10. The processing circuit of claim 1, further comprising a routing module configured to route data packets from the set of source bearers to the third set of target bearers.

11. The processing circuit of claim 1, wherein the set of source bearers is included in a source session established between the electronic apparatus and the source network system before the inter-system HO process and the third set of target bearers is included in a target session established between the electronic apparatus and the target network system after the inter-system HO process.

12. The processing circuit of claim 3, wherein a reflective QoS attribute of the 5G system is disabled in the third set of target bearers.

13. A method of switching an electronic apparatus during an inter-system handover (HO) process from a source network system to a target network system, comprising:
obtaining a mapping relationship between a set of source bearers associated with the source network system and a first set of target bearers associated with the target network system based on QoS characteristics associated with the set of source bearers and the first set of target bearers;
obtaining a second set of target bearers based on resources allocated to the first set of target bearers by the target network system; and
generating a third set of target bearers that is based on the first and second set of target bearers,
wherein one of the set of source bearers and the first set of target bearers includes an access bearer and multiple session bearers that are associated with the access bearer.

14. The method of claim 13, wherein the set of source bearers includes a source session bearer, the first set of target bearers includes multiple target session bearers and a target access bearer associated with the multiple target session bearers, the one of the set of source bearers and the first set of target bearers is the first set of target bearers, the multiple session bearers are the multiple target session bearers, and the access bearer is the target access bearer configured to transmit an aggregate of data packets of the multiple target session bearers.

15. The method of claim 14, wherein the source network system is a 4G system, the target network system is a 5G system, the source session bearer is an EPS bearer, the first multiple target session bearers are multiple QoS flows, the target access bearer is a data radio bearer associated with the multiple QoS flows.

16. The method in claim 13, wherein the set of source bearers includes multiple source session bearers and a source access bearer associated with the multiple source session bearers, the first set of target bearers includes a target session bearer, the one of the set of source bearers and the first set of target bearers is the set of source bearers, the multiple session bearers are the multiple source session bearers, and the access bearer is the source access bearer configured to transmit an aggregate of data packets of the multiple source session bearers.

17. The method of claim 16, wherein the source network system is a 5G system, the target network system is a 4G system, the multiple source session bearers are multiple QoS flows, the source access bearer is a data radio bearer associated with the multiple QoS flows, and the target session bearer is or an EPS bearer.

18. The method of claim 13, further comprising:
receiving mapping signals from the source network system and processing the mapping signals to obtain the mapping relationship.

19. The method of claim 13, further comprising:
routing data packets from the set of source bearers to the third set of target bearers wherein the third set of target bearers includes a target default session bearer configured to transmit data packets not transmitted by other target session bearers.

20. The method of claim 19, wherein the target default session bearer is one of: a QoS flow of a default QoS rule in a 5G system and a default EPS bearer in a 4G system.

* * * * *